(12) United States Patent
Morin et al.

(10) Patent No.: US 7,987,993 B2
(45) Date of Patent: Aug. 2, 2011

(54) SOLID SEPARATOR ESPECIALLY FOR A COMBUSTION FACILITY

(75) Inventors: Jean-Xavier Morin, Neuville aux Bois (FR); Corinne Beal, Voisins-le-Bretonneux (FR); Silvestre Suraniti, Aix-en-Provence (FR)

(73) Assignee: Alstom Technology Ltd., Baden (CH)

( * ) Notice: Subject to any disclaimer, the term of this patent is extended or adjusted under 35 U.S.C. 154(b) by 328 days.

(21) Appl. No.: 12/087,636

(22) PCT Filed: Jan. 23, 2007

(86) PCT No.: PCT/EP2007/050660
§ 371 (c)(1),
(2), (4) Date: Jul. 9, 2008

(87) PCT Pub. No.: WO2007/113016
PCT Pub. Date: Oct. 11, 2007

(65) Prior Publication Data
US 2009/0134072 A1    May 28, 2009

(30) Foreign Application Priority Data
Feb. 2, 2006  (FR) ..................................... 06 50367

(51) Int. Cl.
*B07B 13/00* (2006.01)
*B07C 5/12* (2006.01)
(52) U.S. Cl. .......................... 209/659; 209/133; 209/142
(58) Field of Classification Search .................. 209/133, 209/142, 659
See application file for complete search history.

(56) References Cited

U.S. PATENT DOCUMENTS 3,703,467 A * 11/1972 Lummus ....................... 210/522
3,775,948 A * 12/1973 Beam ............................. 96/313
3,923,008 A * 12/1975 Beckmann et al. ............. 122/34
3,993,448 A * 11/1976 Lowery, Sr. ................... 422/169
4,122,009 A * 10/1978 Tao et al. ....................... 210/708

FOREIGN PATENT DOCUMENTS

| DE | 838676 C | 5/1952 |
| FR | 2850156 | 7/2004 |
| GB | 2130118 | 5/1984 |
| GB | 2130118 A * | 5/1984 |

OTHER PUBLICATIONS

International Search Report dated Nov. 6, 2007.

* cited by examiner

*Primary Examiner* — Terrell H Matthews
(74) *Attorney, Agent, or Firm* — Sofer & Haroun, LLP

(57) ABSTRACT

A separator of solids for separating first and second solids, the diameter and density of the first solids being larger than the diameter and density of the second solids. A first substantially vertical internal baffle (2) forms a passage in the low portion of the separator and forms two compartments (1A, 1B) on the passage of the fluidized solids. The fluidization of each compartment is independently controlled by two fluidization gas inlets (3A, 3B) in order to obtain the desired velocity field for separating the first and second solids in the first compartment (1A) and discharging the second solids through a vent (8), as well as for transferring the first solids into the second compartment (1B). The first baffle (2) is provided on at least one of its substantially vertical faces with fluidization gas ejectors (E2) and the first compartment (1A) is equipped with an internal obstacle arrangement deflecting the path of the solids and at least partially provided with fluidization gas ejectors (E4A) directed towards said first baffle (2).

4 Claims, 4 Drawing Sheets

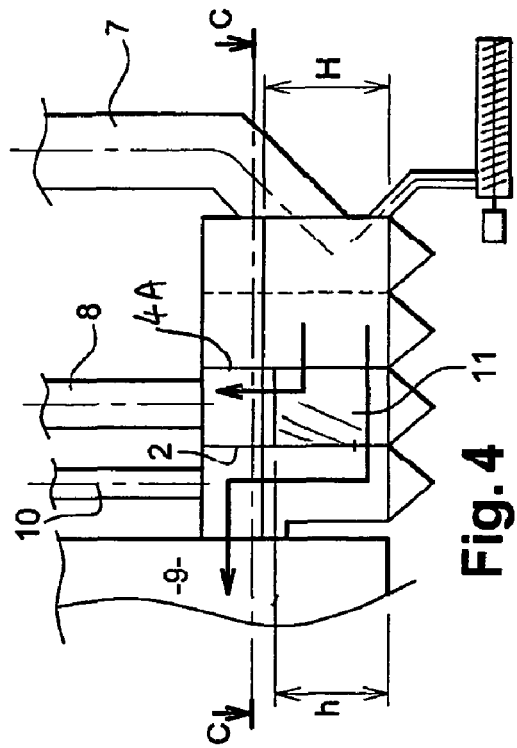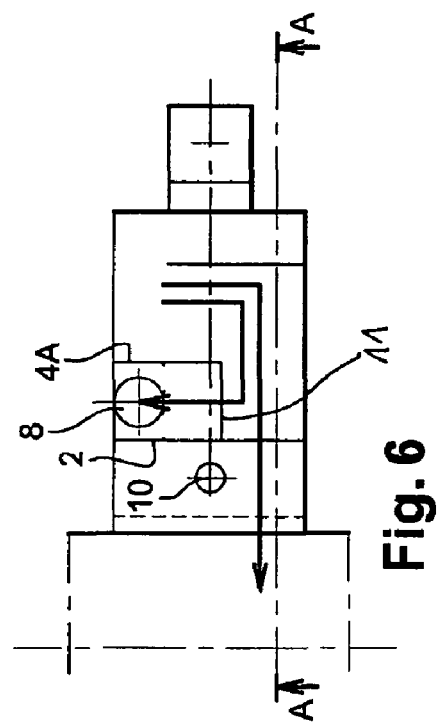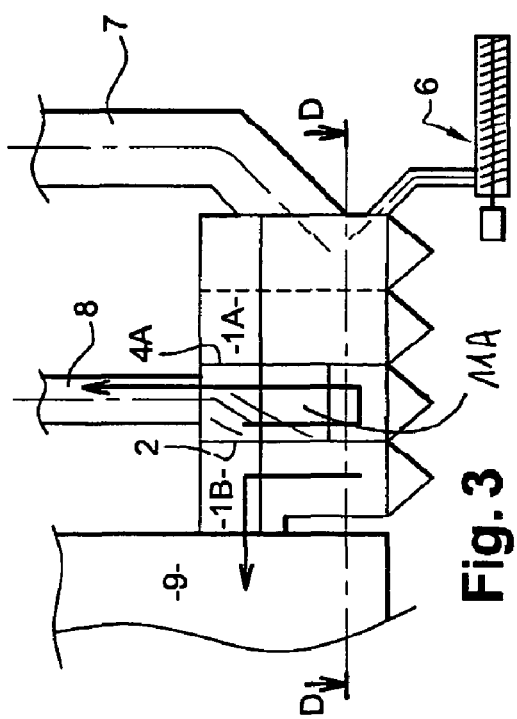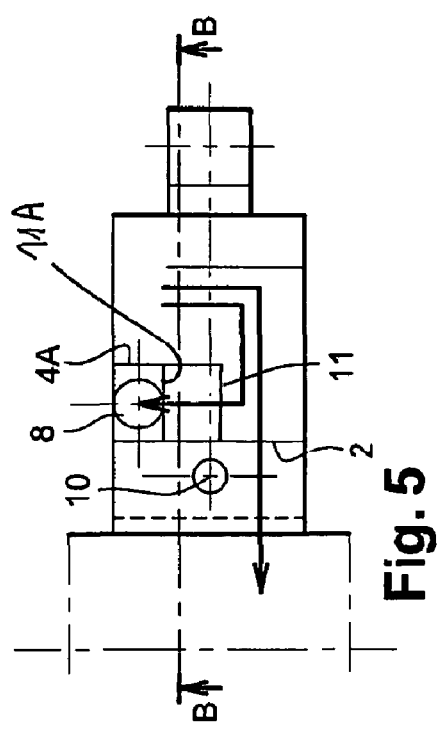

SOLID SEPARATOR ESPECIALLY FOR A COMBUSTION FACILITY

RELATED APPLICATIONS

This application is a National Phase application of PCT/EP2007/050660, filed on Jan. 23, 2007, which in turn claims the benefit of priority from French Patent Application No. 06 50367, filed on Feb. 2, 2006, the entirety of which is incorporated herein by reference.

FIELD OF THE INVENTION

The invention relates to a separator of solids especially for a combustion facility.

BACKGROUND

Such a facility for combusting carbonaceous residues is described in Patent FR 2 850 156.

This facility includes a reactor for reducing oxides, a first cyclone, exchangers for flue gas heat recovery, a reactor for oxidizing oxides, a second cyclone, exchangers for controlling temperature of the circulating oxides, in which circulates an oxide which is reduced and then oxidized in each of both reactors. According to this prior art, the solid combustible material is milled before entering the oxide reduction reactor. The oxides are reduced by first of all having them in contact with the fuel which reacts with the oxygen released by the oxide and then oxidized by contact with air which regenerates the oxide. The reduced size of the solid fuel particles allows more complete and faster combustion and production of nearly 100% of fly ash.

This type of facility for combustion of carbonaceous solid materials operating at atmospheric pressure with integrated capture of carbon dioxide does not require any prior air separation. Because of the simplicity and the compactness of this system the costs of capturing carbon dioxide may be reduced while providing production of steam for generating electricity.

The solid particles at the outlet of the first cyclone associated with the reduction reactor, consisting of metal oxide particles and of carbonaceous residues, pass through a siphon and are then directed towards a device for removing the carbonaceous residue.

This removal device is fluidized by steam. With this fluidization, the fine and light particles such as the carbonaceous residue may be separated and re-introduced into the reduction reactor, while the denser and larger metal oxide particles are transferred towards the oxidation reactor.

This removal device which is a separator, contains an internal baffle formed with a wall integral with the roof of the separator and leaving a flow space in the bottom of the latter and which forms two compartments on the passage of fluidized solids with a pressure seal provided by the height of the fluidized solids, between the two compartments. The fluidization of each compartment is independently controlled by two steam inlets, in order to obtain the desired velocity field for separating the oxides and the carbonaceous residues in the first compartment as well as the transfer of the oxides into the second compartment. Above the first compartment, a vent brings the carbonaceous residues carried off by steam back towards the reduction reactor.

This separator is a carbon barrier in the facility, essential for capturing carbon dioxide which is a greenhouse gas which should be subject to emission restrictions.

OBJECTS AND SUMMARY

The object of the present invention is to increase the yield of this barrier by improving such a separator. By means of the invention, the segregation phenomenon is enhanced, while increasing the time for treating the solids in the first compartment and keeping a separator of limited size.

To do this, the invention relates to a separator of solids intended for separating first solids and second solids, the diameter and density of the first solids being larger than the diameter and density of the second solids, and including a first substantially vertical internal baffle forming a passage in the lower portion of the separator and which forms two compartments on the passage of the fluidized solids, the fluidization of each compartment being independently controlled by two fluidization gas inlets in order to obtain the desired velocity field for separation of the first and the second solids in the first compartment and discharge of the second solids through a vent, as well as the transfer of the first solids into the second compartment, characterized in that said first baffle is provided on at least one of its substantially vertical faces with fluidization gas ejectors and in that the first compartment is equipped with an internal obstacle arrangement deflecting the path of the solids and at least partly provided with fluidization gas ejectors directed towards said first baffle.

By means of the invention, segregation of both types of solids is strongly enhanced.

According to a preferred embodiment, said obstacle arrangement consists of at least a second side baffle consisting of a wall integral with a vertical wall of the compartment and forming a passage in proximity to the opposite vertical wall, the solids being brought into the separator by a wall connecting both of these vertical walls.

Preferably, said second side baffle is provided with said ejectors on its vertical face turned towards said first baffle.

Advantageously, said obstacle arrangement includes a plurality of so-called second alternating side baffles, some integral with a so-called vertical wall and the others integral with the opposite vertical wall.

According to an advantageous feature, the separator includes a weir consisting of a wall connecting said first baffle and said second adjacent baffle and forming a passage in the upper portion of the separator. And advantageously, said weir is positioned under said vent.

By means of this additional feature, separation of both types of solids is improved, after a first segregation.

And preferably, said first compartment comprises a tilted sole, from a high point located at a wall where the solids are brought into the separator towards a low point located in proximity to said first baffle.

Said tilted sole may further be provided with channels parallel to their tilt direction.

And the ribs between channels may be provided with fluidization gas ejectors.

By means of the previous features, the transfer of solids of larger diameter and larger density is optimized.

Advantageously, said vent is located in proximity to said vertical baffle.

The separator may include an extractor connected to its low portion.

A V-shaped valve may advantageously be positioned under said first baffle, in order to control the flow rate of the solids under the latter.

The invention also relates to a separator intended for a facility for combusting carbonaceous materials, the first solids of which are oxide particles and the second particles are carbonaceous residues.

Said fluidization gases may mainly comprise steam and/or carbon dioxide.

Said oxide particles may be metal oxide particles.

The invention finally relates to a facility for combusting carbonaceous materials comprising such a separator, characterized in that said separator is set up at the outlet of a cyclone associated with a reduction reactor or directly set up at the outlet of a reduction reactor.

BRIEF DESCRIPTION OF THE DRAWINGS

The invention is described hereafter in more detail with figures which only illustrate a preferred embodiment of the invention.

FIGS. 3 to 6 are vertical longitudinal sectional views along BB, along AA, along CC and along DD, of a second embodiment of a separator according to the invention.

DETAILED DESCRIPTION

Figure 1:
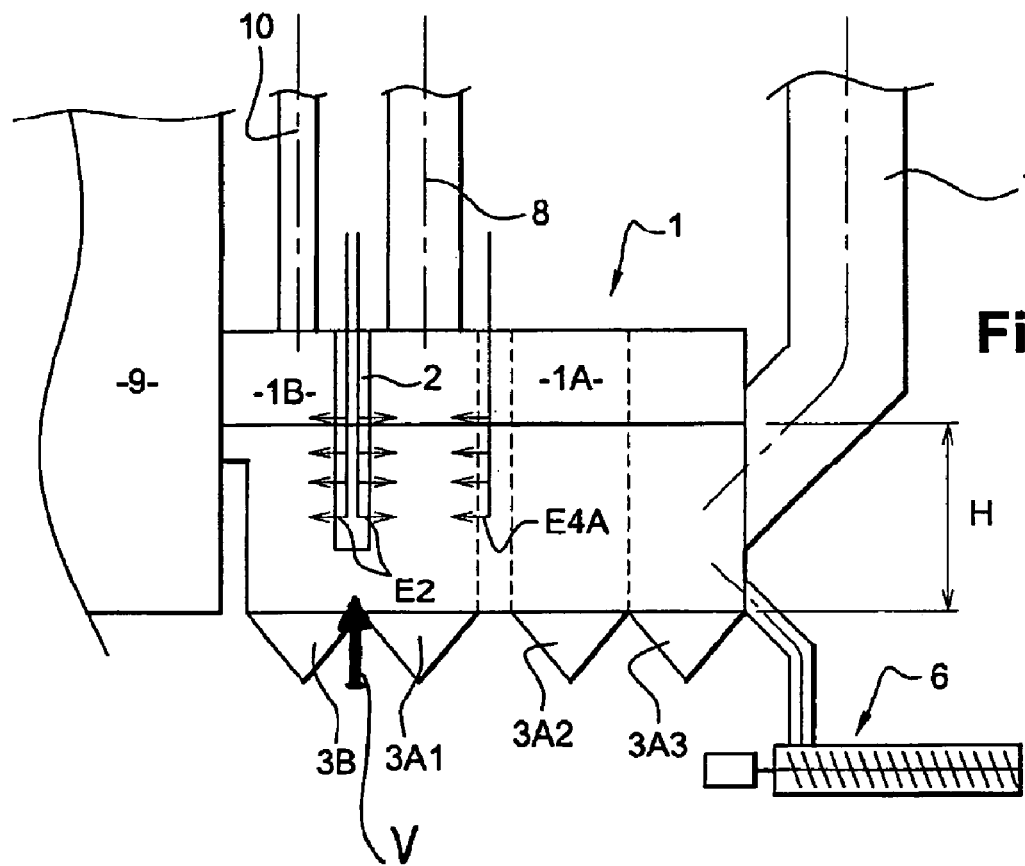
FIGS. 1 and 2 are vertical and horizontal longitudinal sectional views of a first embodiment of a separator according to the invention.
Figure 2:
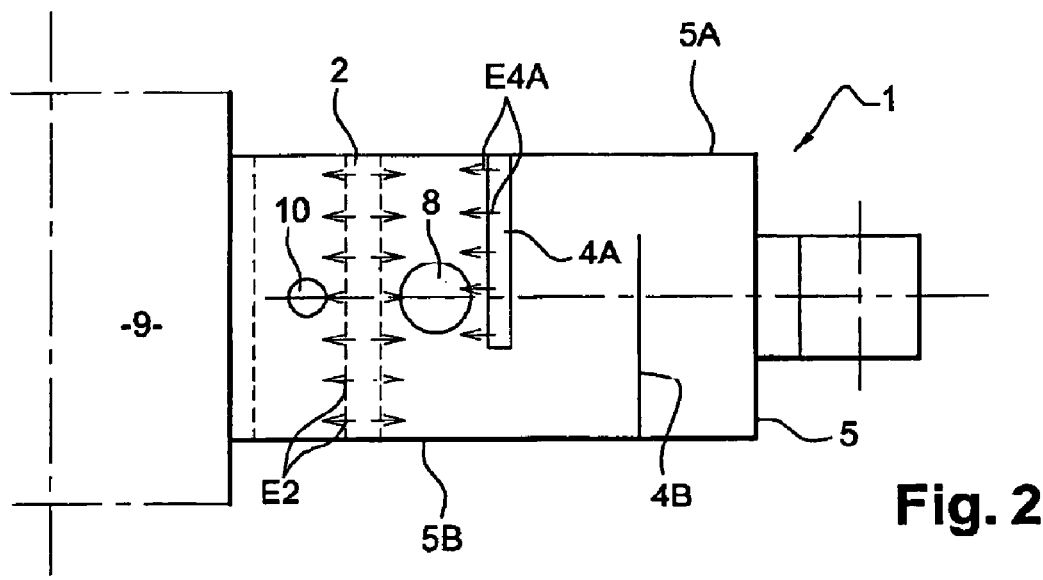

As illustrated in FIGS. 1 and 2, a separator 1 of solids intended for separating first and second solids of different density, the diameter and density of the first solids being larger than the diameter and the density of the second solids, includes a first internal vertical baffle 2 forming a passage in the low portion and which forms two compartments 1A and 1B on the passage of the fluidized solids with a pressure seal, provided by the height H of the fluidized solids, between both compartments, the fluidization of each compartment being independently controlled by two fluidization gas inlets 3A and 3B, in order to obtain the desired velocity field for separating the first solids and the second solids in the first compartment 1 as well as for transferring the first solids into the second compartment 1B.

According to the invention, the first compartment 1A is equipped with an internal obstacle arrangement deflecting the path of the solids.

According to the illustrated example, the separator is substantially parallelepipedous and the obstacle arrangement consists of at least a second side baffle 4A consisting of a wall integral with a vertical wall of the compartment 5A and forming a passage in proximity to the opposite vertical wall 5B, the solids being brought into the separator by the wall 5 connecting both of these vertical walls.

The obstacle arrangement may include a plurality of second alternating side baffles, some integral with a vertical wall and the others integral with the opposite vertical wall. According to the example illustrated in FIGS. 1 and 2, these side deflectors are two in number, one of them 4A being integral with a vertical wall 5A of the compartment and forming a passage in proximity to the opposite vertical wall 5B, and the other one 4B being integral with said opposite vertical wall 5B of the compartment and forming a passage in proximity to the vertical wall 5A.

According to an important feature of the invention, the first baffle 2 is provided on at least one of its substantially vertical faces with fluidization gas ejectors E2, and preferably both of theses faces are provided with such ejectors distributed over the height of the first baffle 2.

The obstacle arrangement of the first compartment 1A is also at least partially provided with fluidization gas ejectors directed towards the first baffle 2. According to a preferred and illustrated embodiment, the second side baffle 4A is provided with these ejectors E4A on its vertical face turned towards the first baffle 2.

By means of this arrangement of second baffles, the path of the solids is extended in the first compartment without significant congestion of the separator. This provides better segregation of the solids in the first compartment. Furthermore, the fluidization gas ejectors equipping the first baffle 2 and the second adjacent baffle 4A, further increase fluidization before the first solids of larger diameter and density pass under the first baffle 2.

Such a separator is particularly intended for a carbonaceous material combustion facility, as described in Patent FR 2 850 156, the first solids being metal oxide particles, the second particles being carbonaceous residues and the fluidization gases mainly comprising steam and/or carbon dioxide.

The solid particles consisting of metal oxide particles and carbonaceous residues, at the outlet of a first cyclone associated with a reduction reactor, pass through a siphon and are then directed towards the separator 1 through a duct 7 which may be equipped with a valve for controlling the flow rate of solids. Additionally, a V-shaped valve referenced as V in FIG. 1 may also be used and positioned under the vertical baffle 2, in order to control the flow rate of the solids passing through the latter between both compartments 1A and 1B, in order to create additional space for retaining the solids and to adjust the level of solids in the separator.

With fluidization, the fine and light particles formed by the carbonaceous residues may be separated and re-introduced into the reduction reactor through a vent 8 located in proximity to the vertical baffle 2, while denser and larger metal oxide particles are transferred towards an oxidation reactor 9, the possibly still present fluidization gas being discharged through a second vent 10 arranged above the second compartment 1B.

Another feature of the separator according to the invention is illustrated in FIGS. 3 to 6.

Here, the separator also includes a weir consisting of a wall 11 connecting the first baffle 2 and the second adjacent baffle 4A and forming a passage in the high portion of the separator. At this weir, the first baffle 2 is closed in the low portion of the separator so as to form a sort of discharge well. This weir is positioned under the vent 8 from which less dense and less coarse solids escape, i.e., according to the specific application, the carbonaceous residues.

The height h of this discharge wall 11 visible in FIG. 4 and less than the height H of the fluidized solids, is determined in order to allow discharge of the solids close to the surface of the fluidized solids in the separator.

Inside this discharge well, a baffle 11A integral with the upper wall of the separator is also provided and it leaves a passage at the sole of the separator, in order to provide compensation of pressures.

This weir arrangement ensures perfect separation of the carbonaceous residues downstream from the segregation provided by the first baffle 2 and the second baffles 4 equipped with their fluidization gas ejectors E.

Figure 7:
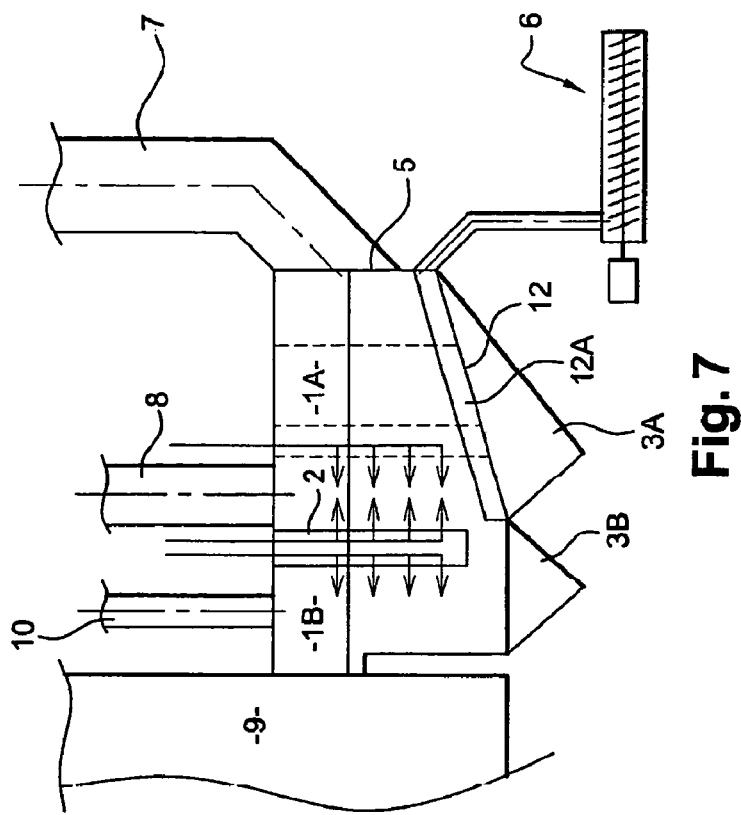
FIG. 7 is a vertical longitudinal sectional view of a third embodiment of a separator according to the invention.

Another feature of the separator according to the invention is illustrated in FIGS. 7 and 8.

The first compartment 1A comprises a tilted sole 12, from a high point located at the wall 5 where the solids are brought into the separator by the inlet duct 7 towards a low point located in proximity to the first baffle 2. Advantageously, the sole is tilted by an angle larger than or equal to 10° with respect to the horizontal.

This tilted sole 12 may further be provided with channels 12B separated by ribs 12A parallel to its tilt direction and these ribs 12A may be provided with fluidization gas ejectors fed through a corresponding vent box 3A.

This sole arrangement improves the transfer of solids of larger diameter and larger density, upstream from the first baffle 2.

Figure 8A:
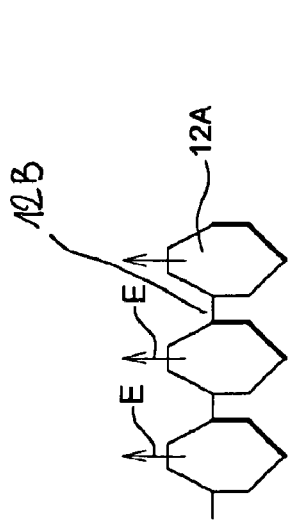
FIGS. 8A to 8C are detailed vertical transverse sectional views along E-E of this third embodiment of a separator according to the invention.
Figure 8B:
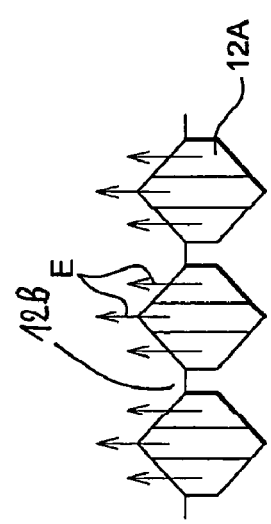
Figure 8C:
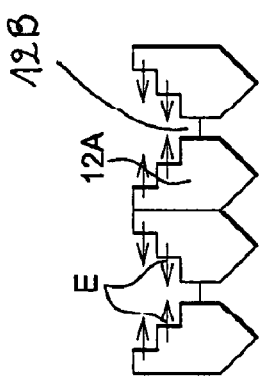

Several alternative embodiments of these ribs are illustrated in FIGS. 8A-8C.

According to the alternatives illustrated in FIGS. 8A and 8B, each rib 12A includes a line of ejectors E directed upwards, each rib may comprise in the transverse direction, an ejector as illustrated in FIG. 8A or several ejectors as illustrated in FIG. 8B.

According to the alternative illustrated in FIG. 8C, each rib 12A includes at least one ejector E directed horizontally and positioned on the flanks of the rib.

The separator also includes an extractor 6 connected to its low portion.

Figure 9:
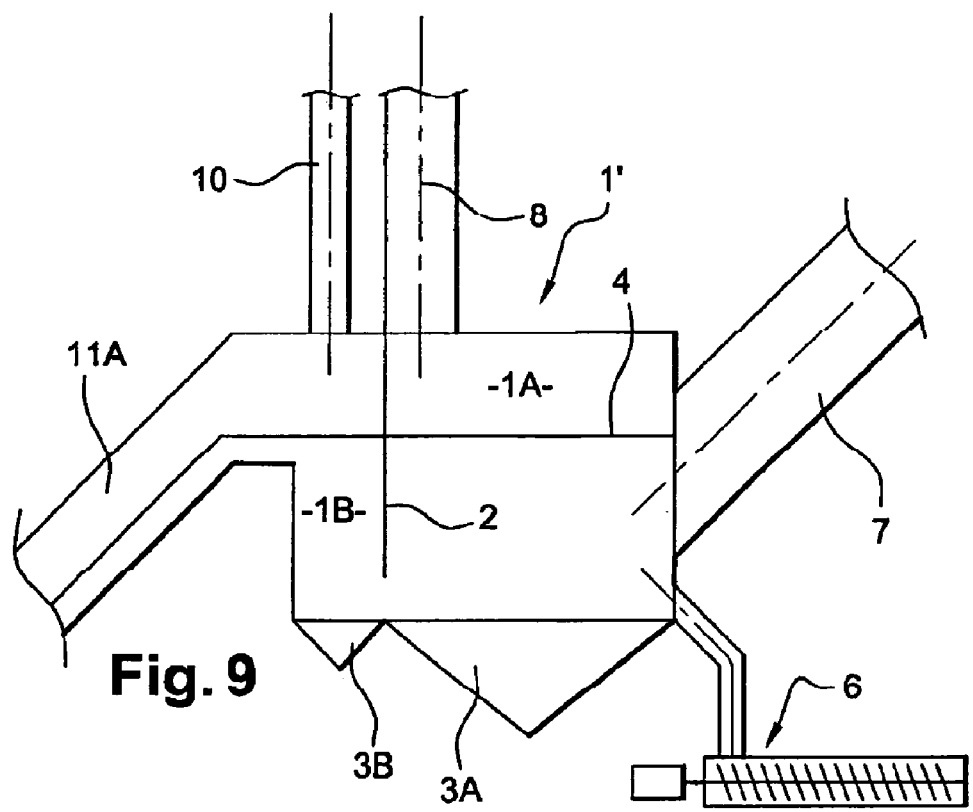
FIG. 9 is a vertical sectional view of an alternative arrangement of a separator according to the invention.

An alternative separator arrangement 1' is illustrated in FIG. 9 which only differs by its outlet arrangement for oxide particles from the second compartment 1B.

Here, these solids are discharged via a discharge downward duct 11A instead of being directly discharged into the oxidation reactor. This embodiment is used when the reactor is distant from the separator 1'.

Figure 10:
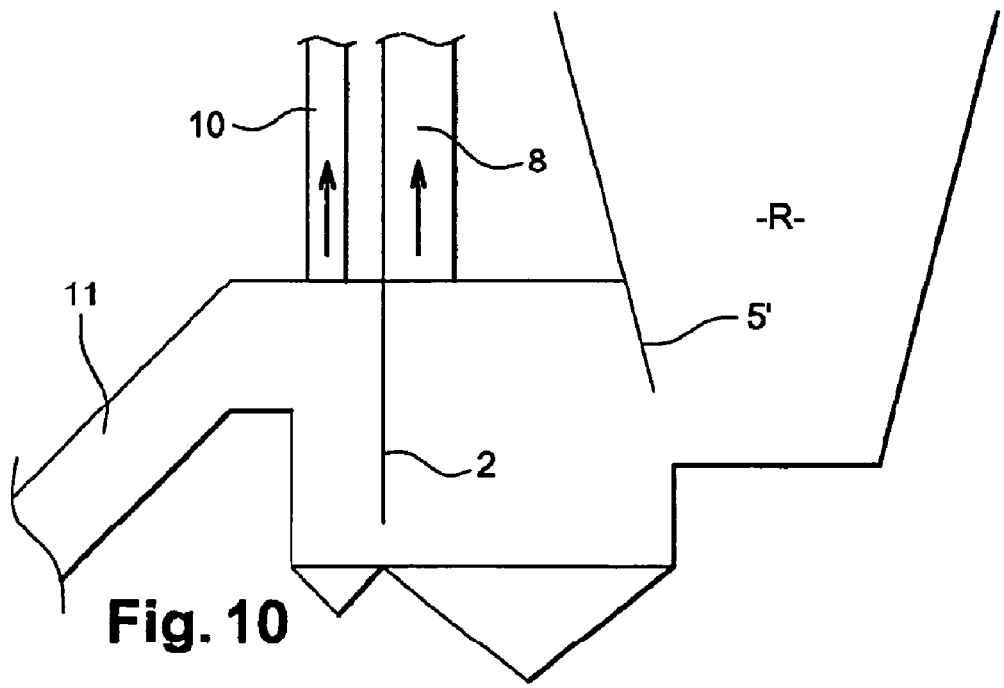
FIG. 10 is a vertical sectional view of another alternative arrangement of a separator according to the invention.

Another alternative separator 1" is illustrated in FIG. 10 which only differs from the former by its inlet arrangement for solids.

A separator as described above may also be directly set up associated with the reduction reactor R of a facility for combusting carbonaceous materials, as described in Patent FR 2 850 156.

In this case, it is either connected at the inlet at the bottom of this reactor through a duct of the same type as that of the duct 7 described earlier, or integrated to this reactor R through a common wall portion as illustrated in FIG. 10.

The wall 5 where this inlet for solids is found, then has a portion 5' common to the truncated wall of the reactor R in which an aperture is arranged for the passage of the solids which are at the bottom of the reactor.

The invention claimed is:

1. A separator for solids for separation of first solids and second solids, the diameter and density of the first solids being larger than the diameter and density of the second solids, said separator comprising:
   a first substantially vertical internal baffle forming a passage in the lower portion of the separator;
   two compartments formed by said vertical internal baffle, on the passage of the fluidized solids;
   two fluidization gas inlets for independently controlling the fluidization of each compartment in order to obtain the desired velocity field for separating the first and second solids in the first compartment and discharging the second solids through a vent, as well as for transferring the first solids into the second compartment, wherein said first baffle is provided on at least one of its substantially vertical faces with fluidization gas ejectors and in that the first compartment is equipped with at least a second side baffle for deflecting the path of the solids and at least partially provided with fluidization gas ejectors directed towards said first baffle, wherein said second side baffle has a wall integral with a vertical wall of the compartment and forming a passage in proximity to an opposite vertical wall, the solids being brought into the separator by a wall connecting both of these vertical walls and wherein said second side baffle is provided with said ejectors on its vertical face turned towards said first baffle.

2. The separator according to claim 1, further comprising a plurality of said second side baffles which are alternating, some integral with a vertical wall and the others integral with an opposite vertical wall.

3. The separator according to claim 1, further comprising a weir having a wall connecting said first baffle and said second adjacent baffle and forming a passage in the high portion of the separator.

4. The separator according to claim 3, wherein said weir is positioned under said vent.

* * * * *